United States Patent
Lavergne et al.

[11] Patent Number: 6,123,290
[45] Date of Patent: *Sep. 26, 2000

[54] HELICOPTERS EQUIPPED WITH JET DILUTION/DEFLECTION MEANS FOR THE COMBUSTION GASES

[75] Inventors: Michel Lavergne, Matsue; Olivier Bosqui, Cabries; Robert Allemand, Salon de Provence, all of France

[73] Assignee: Eurocopter France, Marignane Cedex, France

[*] Notice: This patent issued on a continued prosecution application filed under 37 CFR 1.53(d), and is subject to the twenty year patent term provisions of 35 U.S.C. 154(a)(2).

[21] Appl. No.: 08/572,442

[22] Filed: Dec. 14, 1995

[30] Foreign Application Priority Data

Dec. 19, 1994 [FR] France .................................. 94 15243

[51] Int. Cl.⁷ .................................................. B64C 27/00
[52] U.S. Cl. ...................... 244/17.11; 244/53 R; 244/121
[58] Field of Search ............................... 244/17.11, 53 R, 244/121; 239/127.1, 127.3, 265.11, 265.19; 60/264, 266, 39.5

[56] References Cited

U.S. PATENT DOCUMENTS

| | | |
|---|---|---|
| 3,540,680 | 11/1970 | Peterson . |
| 3,921,906 | 11/1975 | Nye et al. ............................. 239/127.3 |
| 3,930,627 | 1/1976 | Miller ...................................... 244/121 |
| 4,018,046 | 4/1977 | Hurley ............................ 239/265.19 X |
| 4,136,518 | 1/1979 | Hurley et al. .............................. 60/264 |
| 4,312,480 | 1/1982 | Miller ................................... 239/127.3 |
| 4,566,270 | 1/1986 | Ballard et al. ................... 239/127.3 X |

FOREIGN PATENT DOCUMENTS

| | | |
|---|---|---|
| 2338380 | 8/1977 | France . |
| 2508412 | 12/1982 | France . |
| 3129305 | 2/1983 | Germany . |

OTHER PUBLICATIONS

Air International / Jan. 1990—MIL MI–28 HAVOC–Cutaway Drawing.

*Primary Examiner*—Peter M. Poon
*Assistant Examiner*—Judith A. Nelson
*Attorney, Agent, or Firm*—Henderson & Sturm LLP

[57] ABSTRACT

This relates to a helicopter in which the outlet nozzle from the turbine engine is provided with an exhaust pipe which mixes the combustion gases with fresh air and directs the mixture downward. Viewed from the outside of the helicopter, the exhaust pipe is completely concealed by a cowling which is separated from said exhaust pipe by an empty intermediate space, air intakes being provided to create a flow of ambient air, including during hovering flight, along the intermediate space as far as an outlet which is open substantially vertically downward.

16 Claims, 7 Drawing Sheets

HELICOPTERS EQUIPPED WITH JET DILUTION/DEFLECTION MEANS FOR THE COMBUSTION GASES

The present invention relates to helicopters equipped with jet dilution/deflection means for the combustion gases, and especially to military helicopters in which an increase in discretion is sought with respect to detection systems, especially thermal detection systems or systems for laser detection by backscattering from particles in the atmosphere.

More specifically, the invention applies to ground attack helicopters intended to fly at very low altitude in Nap-Of-the-Earth flight so as to benefit from natural or artificial cover such as reliefs in the terrain, trees, or structures.

In Nap-Of-the-Earth flight at very low altitude, the threats which may concern helicopters come almost exclusively from the hemisphere above, since these threats consist especially of intercepting helicopters generally flying at a higher altitude or of ground/air anti-aircraft systems likely to identify and attack in a substantially horizontal direction the helicopters flying at very low altitude.

It is therefore essential for the helicopters in question to be difficult to detect from above or in a substantially horizontal direction.

To this end, it is known to equip the exhaust nozzle or nozzles of these helicopters with jet dilution/deflection assemblies which, on the one hand, mix the combustion gases leaving the nozzle with fresh air and, on the other hand, deflect the mixture thus produced downward, so as to make it more difficult for the helicopter to be detected from the hemisphere above, especially using thermal means or laser backscattering.

Thus, the hot jet of combustion gases leaving the nozzle benefits from the natural or artificial cover provided by the reliefs of the terrain, the vegetation or structures, so that it is difficult to detect.

Furthermore, the combustion gases do not heat up the blades of the main rotor or the fuselage of the helicopter, and this also reduces the thermal signature of the helicopter.

Finally, the hot combustion gases tend to heat up the ground under the helicopter and, when a missile is heading toward the helicopter from above, this can create a decoy for this missile, because the helicopter moves away as soon as it perceives the approach of the missile.

The Russian helicopter MIL MI-28 HAVOC constitutes one example of a helicopter equipped with such a jet deflector.

This helicopter includes at least one gas turbine engine which drives at least one main rotor and which has a nozzle for expelling the combustion gases, an exhaust pipe surrounding said nozzle and extending downstream beyond this nozzle, thereby forming a downward-pointing elbow which opens to the atmosphere via at least one outlet open essentially downward, the exhaust pipe including at least one air intake which communicates with the atmosphere and which is shaped to draw ambient air into the exhaust pipe under the effect of the combustion gases leaving the nozzle.

Another example of a helicopter equipped with quite a similar jet deflector is disclosed in document DE-C-31 29 305, although the outlet of the exhaust pipe of this helicopter is in this case open essentially toward the rear, which is detrimental with respect to the horizontal detection of the helicopter and which eliminates the aforementioned decoy effect.

The jet dilution/deflection assembly which equips the aforementioned MIL MI-28 HAVOC helicopter does however have the drawback that its exhaust pipe is directly exposed on the outside of the fuselage, so that this pipe, under the effect of the heating resulting from the combustion gases, may have a relatively strong thermal signature which is likely to reduce the discretion of the helicopter.

The specific objective of the present invention is to alleviate this drawback.

To this end, according to the invention, a helicopter of the kind defined hereinabove is essentially one wherein, viewed horizontally from the outside of the helicopter or from a position situated above the helicopter, the exhaust pipe is completely concealed by a cowling separated from said exhaust pipe by an intermediate space, air supply means being provided to create a flow of ambient air, including during hovering flight, along said intermediate space as far as at least one outlet which is situated level with the outlet from the exhaust pipe and which is also open essentially downward.

Thus, only the cowling which surrounds the exhaust pipe is visible from the outside, and this cowling undergoes practically no heating by virtue of the flow of fresh air generated in the intermediate space left between said cowling and the exhaust pipe, a feature which appreciably reduces the thermal signature of the helicopter.

In preferred embodiments, recourse is further had to one and/or other of the following provisions:

- the abovementioned intermediate space surrounds the exhaust pipe, which is supported only locally by support members which pass through the intermediate space substantially without interfering with the flow of ambient air which travels through this intermediate space; thus heat transfers from the exhaust pipe toward other parts of the helicopter are avoided, and this contributes to the thermal discretion of said helicopter;
- the cowling which conceals the exhaust pipe includes a part which is exposed to the ambient air blown downward by the main rotor, and the means for supplying the intermediate space with air include vents formed in said part of the cowling which is exposed to the ambient air blown by the main rotor, these vents being shaped so as to cause some of said ambient air blown by the main rotor to enter the intermediate space;
- each vent includes a slit made in the cowling in a longitudinal direction, substantially transverse to the flow along said cowling of the ambient air blown by the main rotor, each slit including a downstream edge which is connected to a deflector along the entire length of said slit, this deflector extending upstream, and away from the cowling and covering the entire slit, each vent thus constituting a baffle which prevents the nozzle and the exhaust pipe from being seen directly from the outside;
- the vents are open toward the front of said helicopter;
- the means for supplying the intermediate space with air include at least one fan for propelling ambient air into said intermediate space;
- the air intake of the exhaust pipe includes transverse fins which prevent a direct view of the inside of said air intake;
- the exhaust pipe internally includes deflectors for controlling the direction of the gas flow leaving said exhaust pipe;
- the helicopter includes a main airframe which includes two juxtaposed gas turbine engines and which is extended toward the rear via a tail boom extending as far as a countertorque rotor, this countertorque rotor being driven in rotation by a transmission shaft which extends longitudinally inside the tail boom, the helicopter including two exhaust pipes on either side of the transmission shaft;

the two exhaust pipes pass through the tail boom and have their outlet located under said tail boom;

the two exhaust pipes are each surrounded by an intermediate space through which a flow of ambient air travels, the two intermediate spaces having a common portion in the whole of their region lying between the two exhaust pipes, and the outlet of the two intermediate spaces also being common to the outlets of both exhaust pipes;

the two exhaust pipes are located outside the tail boom, on either side thereof;

the outlets of the two exhaust pipes are arranged laterally with respect to the tail boom and the tail boom includes means for the forced circulation of ambient air, these means being arranged on either side of the tail boom level with the respective outlets of the two exhaust pipes, so as to direct the flow leaving the exhaust pipes away from the tail boom, which avoids the tail boom being heated at the exhaust pipe outlet and thus allows the helicopter greater thermal discretion;

the helicopter includes a main airframe which includes a single gas turbine engine and which is extended toward the rear via a tail boom extending as far as a countertorque rotor, this countertorque rotor being driven in rotation by a transmission shaft which extends longitudinally inside the tail boom, the exhaust pipe including an upstream portion which extends above the transmission shaft and which is extended rearwards and downwards by two downstream portions located respectively on either side of the transmission shaft;

the nozzle is circumferentially corrugated, forming a plurality of lobes which extend radially;

the helicopter includes means for forcing ambient air to circulate toward the exhaust pipe.

Further features and advantages of the invention will emerge in the course of the following detailed description of several of its embodiments, given by way of nonlimiting examples with respect to the attached drawings.

In the drawings:

FIG. 3 is a view from above corresponding to FIG. 2, FIGS. 4, 5, 6 are sectional views on IV—IV, V—V and VI—VI respectively, of FIG. 2.

In the various figures the same references denote identical or similar elements.

Figure 1:
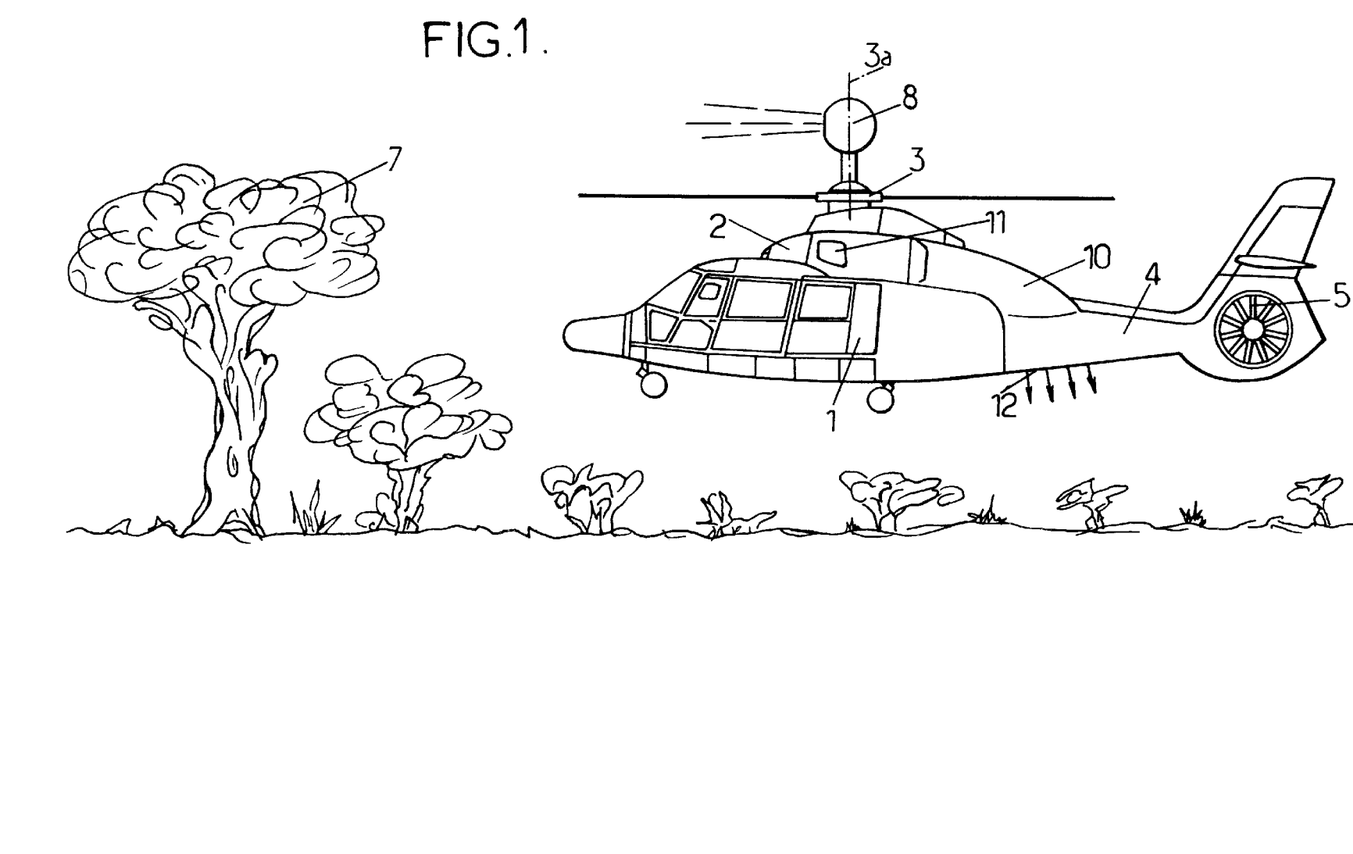
FIG. 1 is an elevation representing a helicopter according to one embodiment of the invention, in Nap-Of-the-Earth flight.

The helicopter represented in FIG. 1 conventionally includes an airframe 1 which includes, inter alia, two juxtaposed gas turbines 2 driving a main rotor 3 which rotates about an axis 3$a$ which is substantially vertical when the helicopter is in a normal position.

Figure 2:
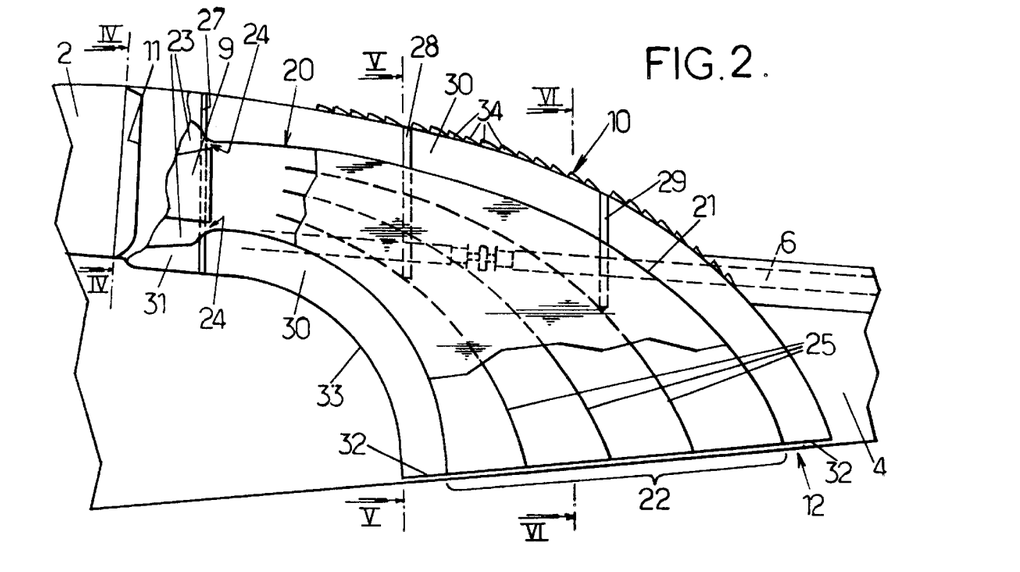
FIG. 2 is a detailed elevation with partial cutaway of the helicopter of FIG. 1, showing one of the jet dilution/deflection assemblies of this helicopter, FIG. 2A a detailed view of FIG. 2, showing one the cooling vents of the jet dilution/deflection assembly of FIG. 2.
Figure 4:
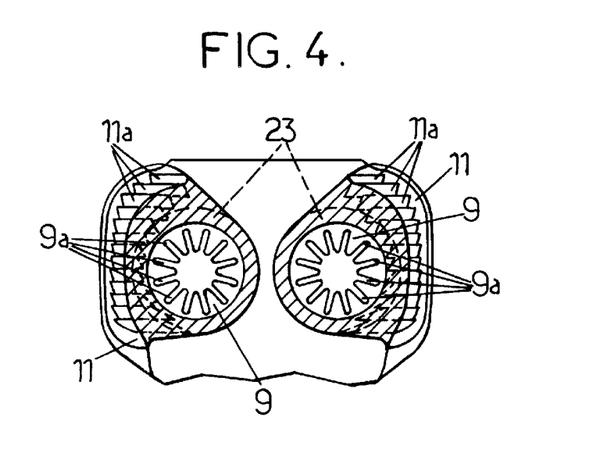

Each gas turbine engine 2 is extended toward the rear by a nozzle 9 for the exhaust of the combustion gases (see FIG. 2). Advantageously, this nozzle may exhibit circumferential corrugations which form a plurality of lobes 9$a$ extending radially (see FIG. 4) as explained, for example, in document FR-A-2 515 735. This type of nozzle is known as a "daisy nozzle".

From the airframe 1, a tail boom 4 extends toward the rear and includes at its rear end a countertorque rotor 5.

The countertorque rotor 5 is driven in rotation by means of a transmission shaft 6 (FIG. 2) which extends longitudinally in the tail boom 4 from the main reduction gear or main transmission box arranged close to the power source, as far as the tail rotor 5.

The helicopter represented in FIG. 1 is specifically designed to fly at very low altitude in Nap-Of-the-Earth flight so that it can shelter behind the cover of the landscape, such as trees 7 or the like.

Advantageously, this helicopter may be equipped with a periscope sight 8 centered on the axis of the main rotor 3 and extending above this main rotor, or alternatively with a roof-mounted sight, so that the helicopter crew can make observations and prepare the helicopter weaponry while remaining under cover behind the trees 7 or the like.

In order to optimize the discretion of the helicopter especially with respect to thermal detection means or laser backscattering detection means, each gas turbine engine 2 is provided with a jet dilution/deflection assembly 10 which is provided with an air intake 11 for mixing fresh air with the combustion gases leaving the gas turbine engine and for directing the mixture thus produced as far as an outlet 12 which is open downward substantially parallel to the axis 3$a$ of the main rotor.

In other words, the outlet 12 of the exhaust pipe is substantially contained within a plane whose normal forms a relatively small angle with the axis 3$a$ of the rotor, so that this normal forms a relatively small angle with the vertical when the helicopter is in its most common position. The flow of gases leaving the outlet 12 is directed downward, but not necessarily exactly vertically.

This arrangement has the advantage of avoiding the exhaust gases being recirculated toward the air intakes of the gas turbine engines, since the outlet 12 is remote from these air intakes, generally at the top of the airframe 1.

As may be seen in more detail in FIGS. 2 to 6, each jet dilution/deflection assembly 10 includes an exhaust pipe 20 which surrounds the corresponding nozzle 9 and which extends toward the rear beyond this nozzle, diverging and forming an elbow 21 which passes downward through the tail boom 4, the two exhaust pipes 20 passing on either side of the transmission shaft.

Each exhaust pipe opens to the atmosphere under the tail boom via an outlet 22 which is open downward substantially parallel to the axis 3$a$ of the main rotor.

In other words, the outlet 22 of the exhaust pipe is substantially contained within a plane whose normal forms a relatively small angle with the axis 3$a$ of the rotor, so that this normal forms a relatively small angle with the vertical when the helicopter is in its most common position.

Each exhaust pipe 20 has a substantially circular section just downstream of the corresponding nozzle 9, and its section changes continuously in the downstream direction as far as a substantially rectangular section near its outlet 22.

The exhaust pipe 20 associated with each nozzle 9 is designed to draw fresh air in through the air intake 11 corresponding to this nozzle.

In the example represented in the drawings, the air intake 11 associated with a nozzle 9 belonging to one of the gas turbine engines is arranged laterally with respect to this nozzle, on the side of said nozzle which is furthest from the nozzle 9 belonging to the other gas turbine engine.

Each air intake is equipped with fins 11a arranged transversely so as to avoid direct vision toward the inside of said air intake from outside the helicopter, so as to limit the thermal signature of the helicopter.

Furthermore, each air intake 11 communicates with a scroll 23 arranged around the corresponding nozzle 9, which scroll communicates with the rest of the exhaust pipe 20 via an annular restriction 24 which surrounds the rear end of the nozzle 9, and via which the fresh air is drawn in, by a suction effect under the action of the injection of the combustion gases through the nozzle 9.

Thus, the fresh air which enters the exhaust pipe 20 mixes with the combustion gases leaving the nozzle 9, and does so in a particularly efficient way when the nozzle 9 has a so-called "daisy" shape, as defined earlier.

The gas flow which flows through the exhaust pipe 20 thus has a temperature below the temperature of the combustion gases leaving the nozzle 9.

In order to guarantee that the gas flow flowing through the exhaust pipe 20 has a uniform temperature and to ensure good control over the direction of this gas flow, deflectors 25 may advantageously be provided in the exhaust pipe 20. Each deflector 25 extends from an upstream end, situated a certain distance downstream of the nozzle 9, as far as a downstream end, situated level with the outlet 22 of the exhaust pipe, and each deflector follows the overall shape of the exhaust pipe.

Moreover, in order to prevent heating of the two exhaust pipes 20 from damaging the thermal signature of the helicopter, each of these pipes is entirely contained inside of an empty intermediate space 30 which surrounds this exhaust pipe and which extends from an upstream end 31 close to the nozzle 9 as far as an outlet 32 situated level with the outlet 22 of the exhaust pipe.

Like the outlet 22, the outlet 32 is open downward, substantially parallel to the axis 3a of the main rotor.

In other words, the outlet 32 is substantially contained within a plane whose normal forms a relatively small angle with the axis 3a of the rotor, and therefore a relatively small angle with the vertical when the helicopter is in its most common position.

Each intermediate space 30 is bounded toward the outside of the helicopter by a cowling 33, the dorsal part of which is equipped with a plurality of vents 34 which are shaped so as to cause some of the ambient air blown downward by the main rotor to enter the intermediate space.

Figures 2A, 3:
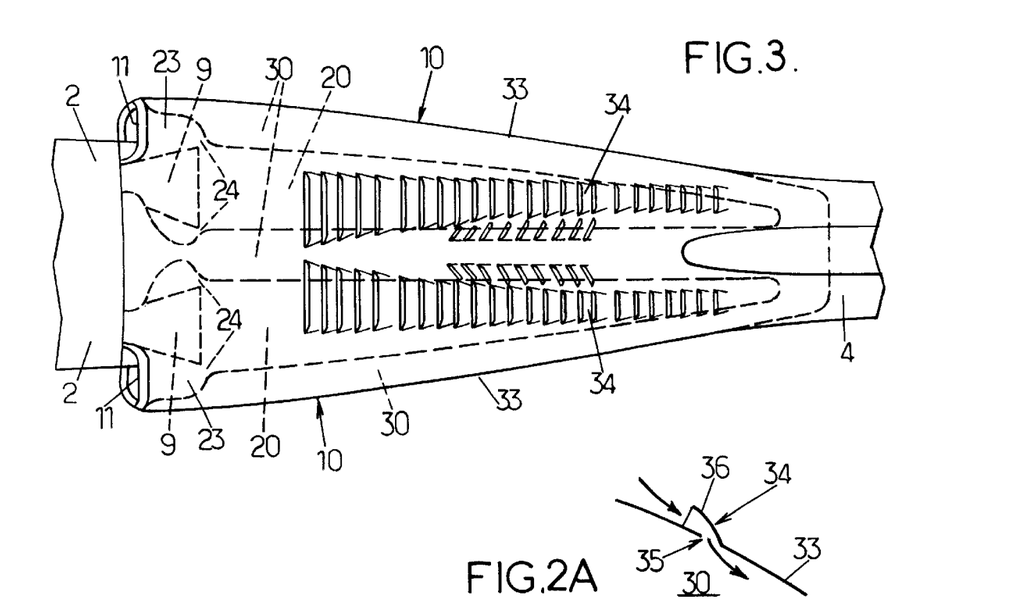

More precisely, as represented in FIG. 2A, each vent 34 is composed of a slit 35 which extends longitudinally, in a direction substantially transverse to the direction of flow of the ambient air blown along the cowling 33 by the main rotor.

A deflector 36 is continuously connected to the downstream edge of the slit 35 along the entire length of said slit, and this deflector 36 extends upstream in the direction of flow of the ambient air blown by the main rotor, thus partially toward the front of the helicopter, moving away from the cowling toward the outside of the intermediate space 30 and covering the entire slit. Thus, the vents 34 form baffles which prevent the hot parts, that is the nozzles 9 and the exhaust pipe 20, from being seen directly from the outside, and this contributes to reducing the thermal signature of the helicopter. The vents 34 may advantageously be open toward the front of the craft where the fairings of the main transmission box and of the main rotor mast form a shield preventing these hot parts from being seen from outside.

The deflectors 36 therefore have the shape of scoops which direct the air blown by the main rotor, and possibly air moving relative to the helicopter when the helicopter is in motion, into the slits 35.

By virtue of the flow of fresh air which enters the intermediate space 30 and which travels through this intermediate space as far as its outlet 32, the heat imparted to the walls of the exhaust pipe 20 by the combustion gases is not transmitted to the cowling 33 or to the rest of the fuselage of the helicopter, and this contributes to the weak thermal signature of the helicopter.

Figure 5:
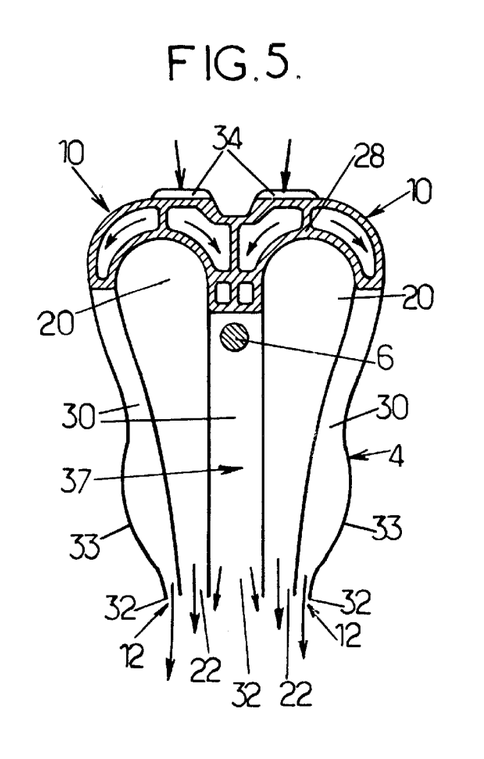

As represented in particular in FIGS. 2 and 5, in order to limit the thermal bridges between the exhaust pipe 20 and the cowling 33 or some other part of the helicopter, the exhaust pipe 20 is supported only locally by perforated rigid frames 27, 28, 29 which pass through the intermediate space 30, essentially without interfering with the flow of fresh air which travels through this intermediate space.

Figure 6:
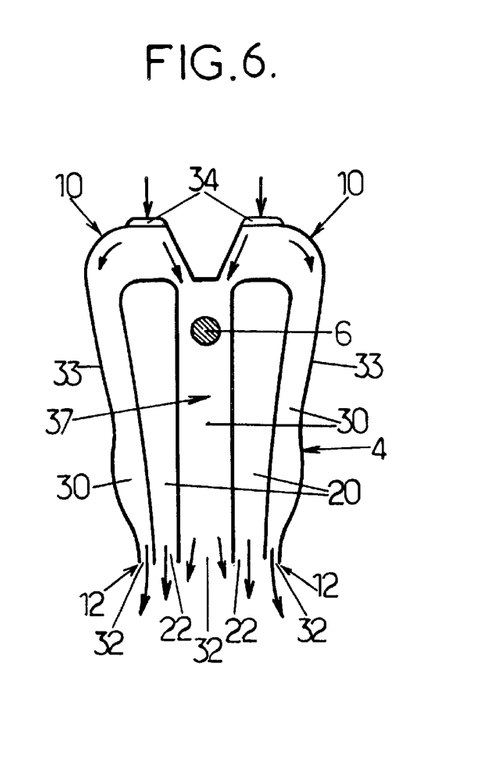
Figure 7:
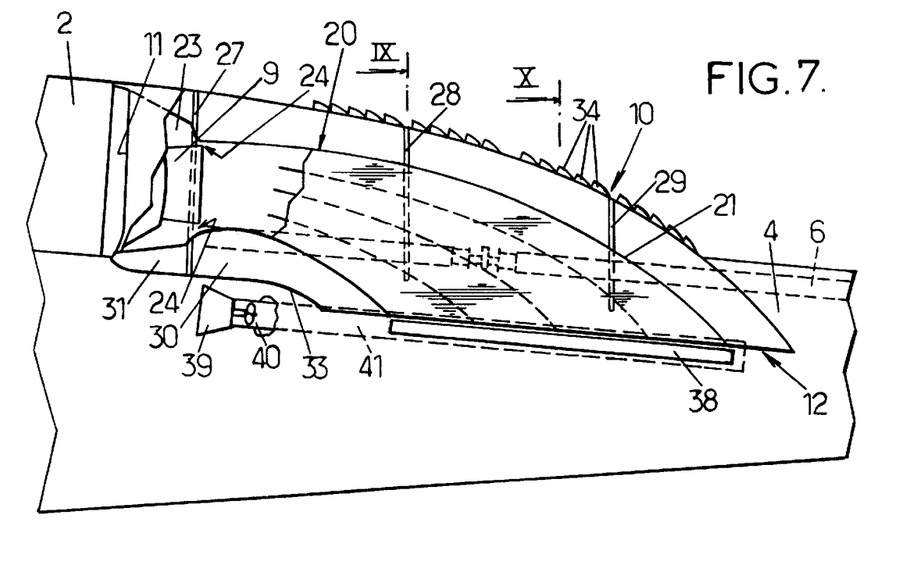
FIG. 7 is a view similar to FIG. 2 for another embodiment of the invention.
Figure 8:
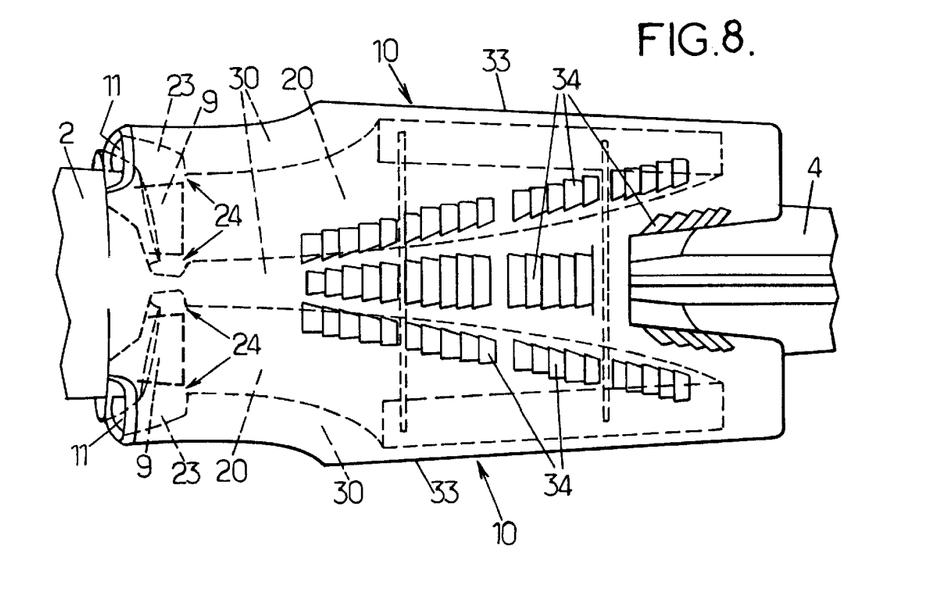
FIG. 8 is a view similar to FIG. 3 for the embodiment of FIG. 7, FIGS. 9 and 10 are sectional views on IX—IX and X—X respectively, of FIG. 7, FIGS. 11 and 12 are partial diagrammatic views, in elevation and from above respectively, of a helicopter according to another embodiment of the invention.

As may be seen in FIGS. 5 and 6, in the specific example dealt with here, the intermediate spaces 30 corresponding to the two exhaust pipes 20 include a common central part 37 between the two exhaust pipes 20, this central part having the transmission shaft 6 for the countertorque rotor passing through it.

FIGS. 7 to 10 represent an alternative to the helicopter of FIGS. 1 to 6. This alternative has many points in common with the embodiment of FIGS. 1 to 6, so that it will not be described in detail but only the differences with respect to the embodiment of FIGS. 1 to 6 will be explained here.

In the alternative of FIGS. 7 to 10, the two jet dilution/deflection assemblies 10 are arranged above the tail boom 4 on either side thereof, instead of passing through it.

This arrangement has the advantage of allowing jet the dilution/deflection assemblies 10 to be easily fitted to an existing helicopter.

Figure 9:
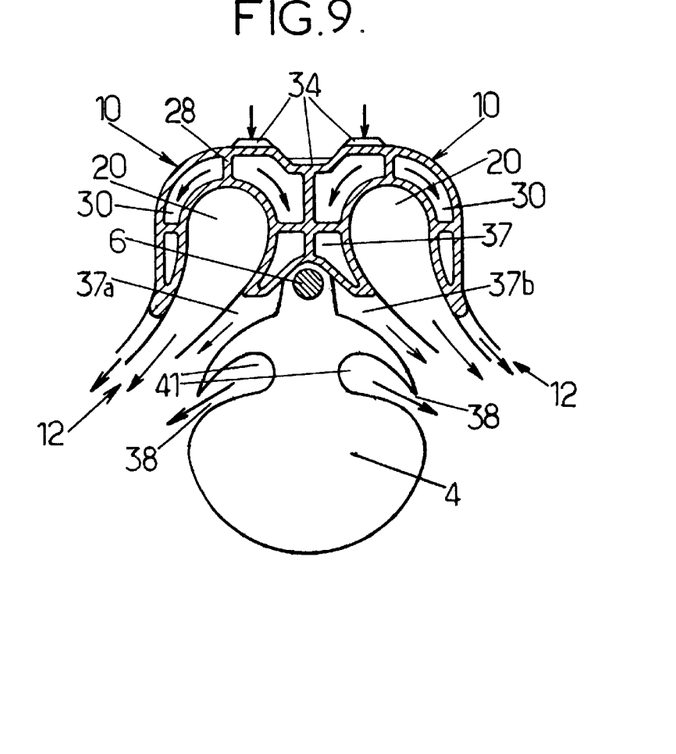
Figure 10:
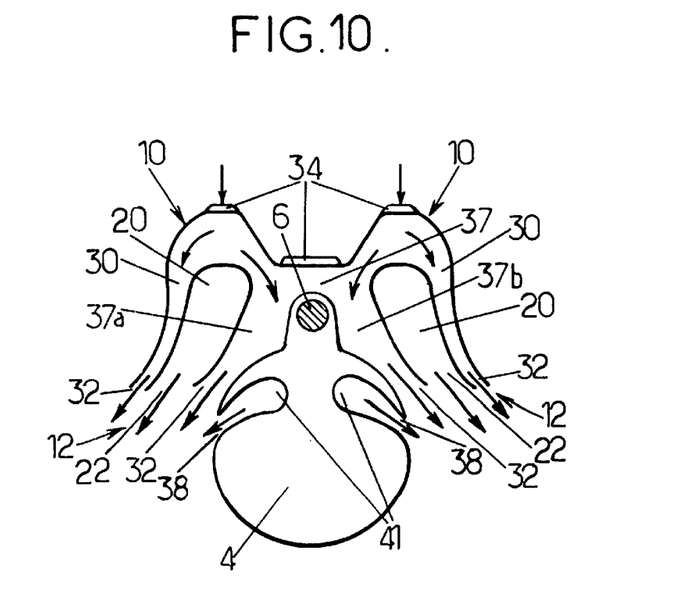

As may be seen particularly in FIGS. 9 and 10, the two intermediate spaces 30 corresponding to the two exhaust pipes 20 therefore include a common central part 37 which is situated only above the tail boom 4, but this central region 37 is split into two lateral regions 37a, 37b below the upper level of the tail boom, the regions 37a and 37b being arranged on either side of the tail boom.

The outlet 12 of each jet diluter/deflector is arranged laterally with respect to the tail boom 4, and to prevent the flow leaving the exhaust pipes from heating up this tail boom, recourse is had to the following provisions:

the two exhaust pipes are oriented so as to direct the flow leaving said exhaust pipes away from the tail boom, the flow of fresh air leaving the regions 37a and 37b of the intermediate space tends to make the flow leaving the exhaust pipes detach from the tail boom, which prevents heat transfer from the hot gases leaving the exhaust pipes toward the tail boom, and, optionally, the tail boom may include a lateral blowing slit 38 on each of its sides even with the outlet 22 of each exhaust pipe and along the entire length of this outlet 22, or optionally along the entire length of the outlet 12, this lateral blowing slit 38 being connected to an air intake 39 by means of a fan 40 and of a duct 41 so as to blow air toward the outside of the tail boom, which directs the flow of hot gas leaving each exhaust pipe even further away from said tail boom.

The fan 40 may optionally be a sand filter extraction fan of the helicopter.

Figure 11:
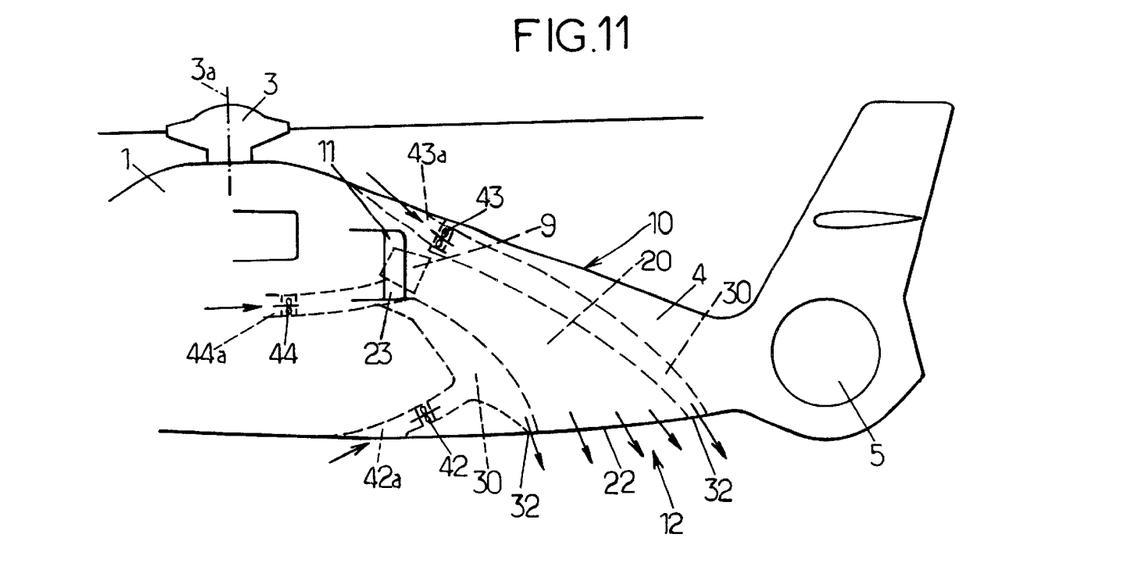
Figure 12:
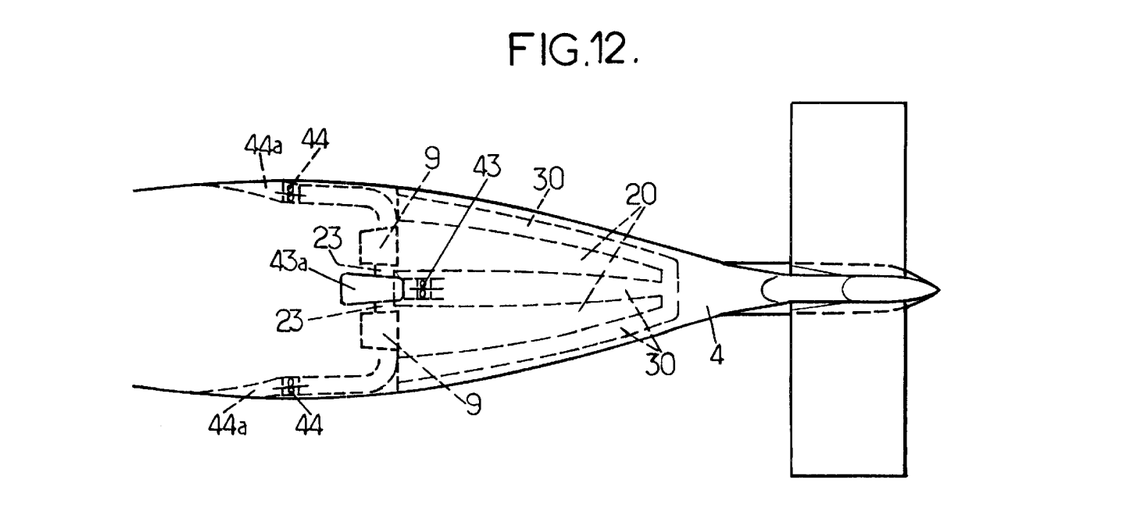

In the alternative represented diagrammatically in FIGS. 11 and 12, the intermediate space 30 of each jet dilution/deflection assembly 10 receives fresh air propelled by two fans 42, 43 communicating respectively with air intakes 42a, 43a above and below the fuselage of the helicopter, although a different number of fans and different locations for air intakes may be envisaged.

In addition, for each nozzle 9, an additional fan 44 may propel fresh air toward the scroll 23 which surrounds this nozzle 9, from a lateral air intake 44a.

One or more of the fans 42, 43, 44 may optionally consist of the sand filter extraction fans of the helicopter.

Figure 13:
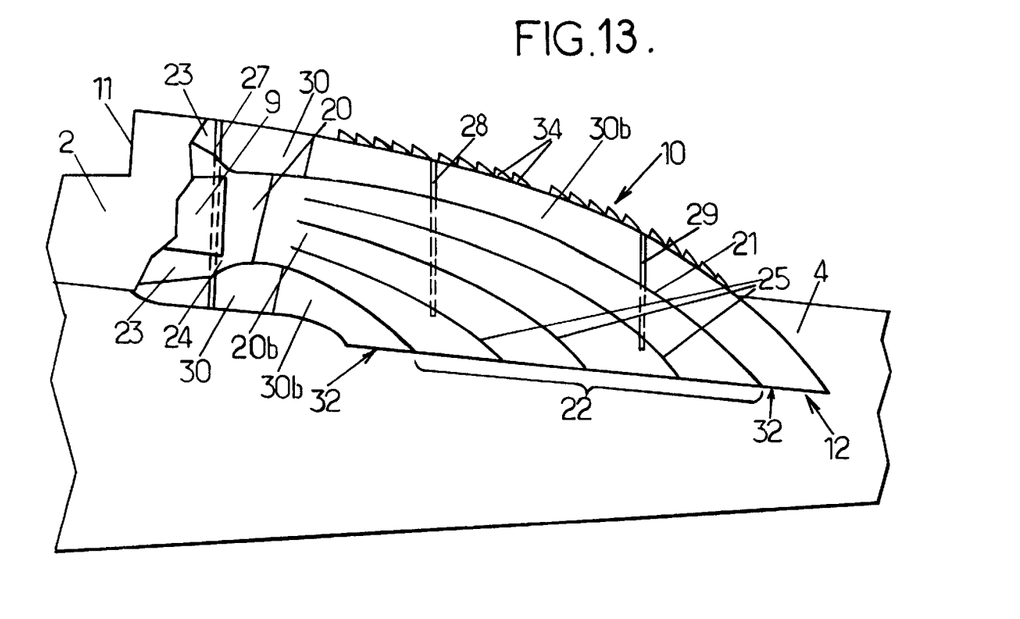
FIGS. 13 and 14 are partial diagrammatic views, in elevation with partial cutaway and from above respectively, of a helicopter according to yet another embodiment of the invention.
Figure 14:
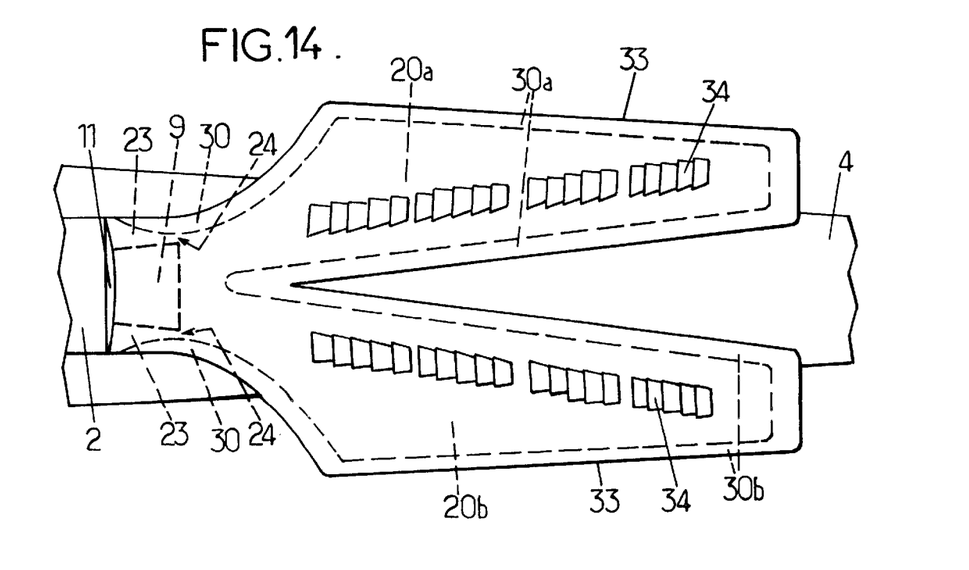

In the alternative of FIGS. 13 and 14, the helicopter has a single gas turbine engine 2, and this gas turbine engine is provided with a jet diluter/deflector 10 which includes a single air intake 11 situated above the nozzle 9 of the gas engine, an exhaust pipe 20 which, as before, has a scroll 23 which surrounds the nozzle 9, an annular restricted passage 24 around the downstream end of the nozzle 9, the pipe 20 starting off as a single piece immediately downstream of the nozzle 9 and then subdividing into two lateral portions 20a, 20b arranged on either side of the tail boom like the two exhaust pipes 20 of FIGS. 7 to 10.

The intermediate space 30 which surrounds the exhaust pipe is itself made as a single piece immediately downstream of the nozzle 9, then subdivides into two lateral portions 30a, 30b each of which surrounds lateral portions 20a, 20b of the exhaust pipe.

As an alternative, the two lateral portions 20a, 20b of the exhaust pipe and the lateral portions 30a, 30b of the intermediate space may penetrate inside the tail boom instead of passing around it.

In the latter case, the lateral portions 20a, 20b of the exhaust pipe would be arranged on either side of the transmission shaft.

What is claimed is:

1. A helicopter comprising at least one gas turbine engine for driving at least one main rotor comprising a nozzle for expelling combustion gases, and an exhaust pipe surrounding said nozzle and extending downstream beyond said nozzle, said exhaust pipe comprising a downward-pointing elbow, said elbow comprising at least one exhaust outlet open essentially downward to atmosphere, said exhaust pipe including and comprising at least one air intake in communication with the atmosphere for drawing ambient air into said exhaust pipe, wherein, when viewed from a point selected from the group consisting of a horizontal position outside of the helicopter and a position situated above the helicopter, said exhaust pipe is substantially completely concealed by a cowling separated from said exhaust pipe by an empty intermediate space, air supply means being provided to create a flow of ambient air along said intermediate space as far as a cowling outlet situated substantially even with said exhaust outlet from said exhaust pipe, said cowling outlet also being open essentially downward.

2. The helicopter as claimed in claim 1, wherein said intermediate space surrounds said exhaust pipe, said exhaust pipe comprising support members for supporting said exhaust pipe, said support members passing through said intermediate space substantially without interfering with ambient air flow traveling through said intermediate space.

3. The helicopter as claimed in claim 1, wherein said main rotor creates a downward flow of ambient air and wherein said cowling comprises a part which is exposed to said downward flow of ambient air created by the main rotor, and wherein said air supply means comprises vents formed in said part of said cowling which is exposed to said downward flow of ambient air created by the main rotor, said vents being shaped so as to permit some of said downward flow of ambient air created by the main rotor to enter said intermediate space.

4. The helicopter as claimed in claim 3, wherein each vent includes a slit made in the cowling in a longitudinal direction, said slit substantially transverse to said downward flow of said ambient air created by the main rotor, wherein each slit includes a downstream edge which is connected to a deflector along the entire length of said slit, said deflector extending upstream, outward and away from said cowling and covering the entire slit, wherein each vent constitutes a baffle which prevents the nozzle and exhaust pipe from being seen directly from the outside.

5. The helicopter as claimed in claim 4, wherein said vents open in a forwardly direction.

6. The helicopter as claimed in claim 1, in which the means for supplying the intermediate space with air include at least one fan for propelling ambient air into said intermediate space.

7. The helicopter as claimed in claim 1, wherein the air intake of the exhaust pipe includes transverse fins, wherein said transverse fins limit the view of the inside of said air intake.

8. The helicopter as claimed in claim 1, wherein said exhaust pipe internally includes deflectors for controlling the direction of the flow leaving said exhaust pipe.

9. The helicopter as claimed in claim 1, comprising at least two gas turbine engines positioned in a juxtaposed configuration, said helicopter comprising a main airframe extending rearwardly via a tail boom, said tail boom extending as far as a countertorque rotor, said countertorque rotor being driven in rotation by a transmission shaft extending longitudinally inside the tail boom, said helicopter comprising a second exhaust pipe, and wherein an exhaust pipe is disposed on each side of said transmission shaft.

10. The helicopter as claimed in claim 9, wherein said two exhaust pipes pass through said tail boom, wherein said second exhaust pipe includes an outlet, and wherein the outlets for said two exhaust pipes are disposed on the underside of said tail boom.

11. The helicopter as claimed in claim 10, wherein said second exhaust pipe is surrounded by an intermediate space through which a flow of ambient air travels, wherein each of said intermediate spaces surrounding said two exhaust pipes include a common portion, said common portion disposed throughout a region lying between said two exhaust pipes, and wherein a common outlet comprises the exhaust outlets for each of said exhaust pipes.

12. The helicopter as claimed in claim 9, wherein said two exhaust pipes are disposed externally to and on the sides of said tail boom.

13. The helicopter as claimed in claim 12, wherein said outlets of said two exhaust pipes are arranged laterally with respect to the tail boom and wherein said tail boom includes means for the forced circulation of ambient air, said forced circulation means being disposed on the sides of said tail boom level with the respective outlets of said two exhaust pipes, wherein exhaust exiting said exhaust pipes is directed away from said tail boom.

14. The helicopter as claimed in claim 1, wherein said gas turbine engine is extended toward the rear of said helicopter via a tail boom extending as far as a countertorque rotor, wherein said countertorque rotor is driven in rotation by a transmission shaft extending longitudinally inside the tail boom, wherein a portion of said exhaust pipe extends above said transmission shaft and wherin said exhaust pipe includes two downstream portions which extend rearwardly and downwardly with one downstream portion located on each side of said transmission shaft.

15. The helicopter as claimed in claim 1, wherein the nozzle is circumferentially corrugated, forming a plurality of lobes which extend radially.

16. The helicopter as claimed in claim 1, comprising means for forcing ambient air to circulate toward said exhaust pipe.

\* \* \* \* \*